April 20, 1926.
E. C. HEAD
HERRINGBONE GEAR
Filed Jan. 23, 1922    2 Sheets-Sheet 1
1,581,737
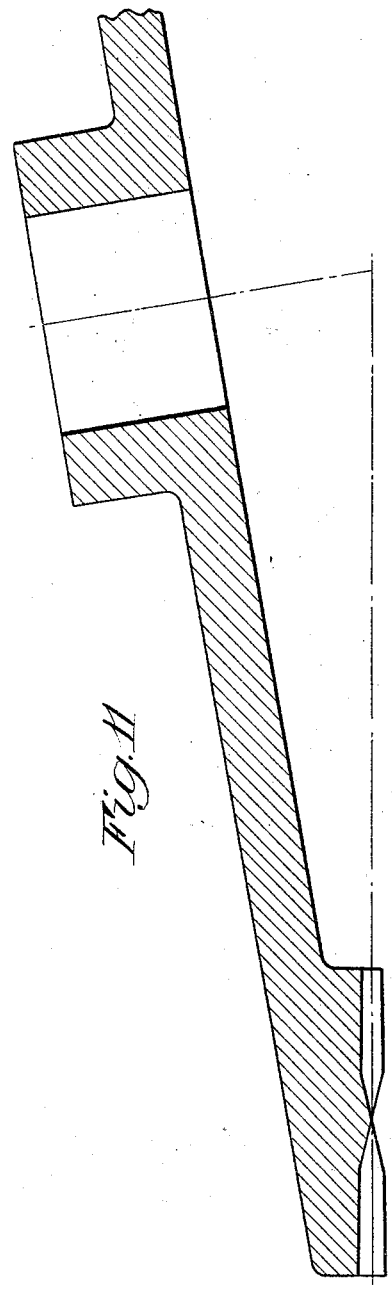
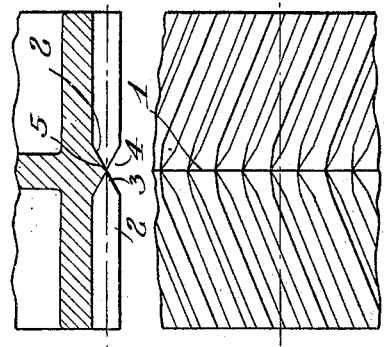
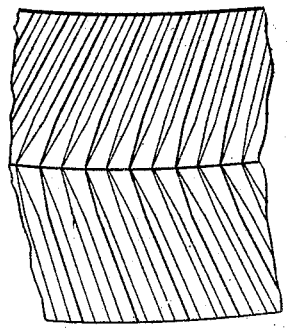
INVENTOR.
Ernest C. Head
Harold E. Stonebraker
his ATTORNEY April 20, 1926.
E. C. HEAD
HERRINGBONE GEAR
Filed Jan. 23, 1922
1,581,737
2 Sheets-Sheet 2
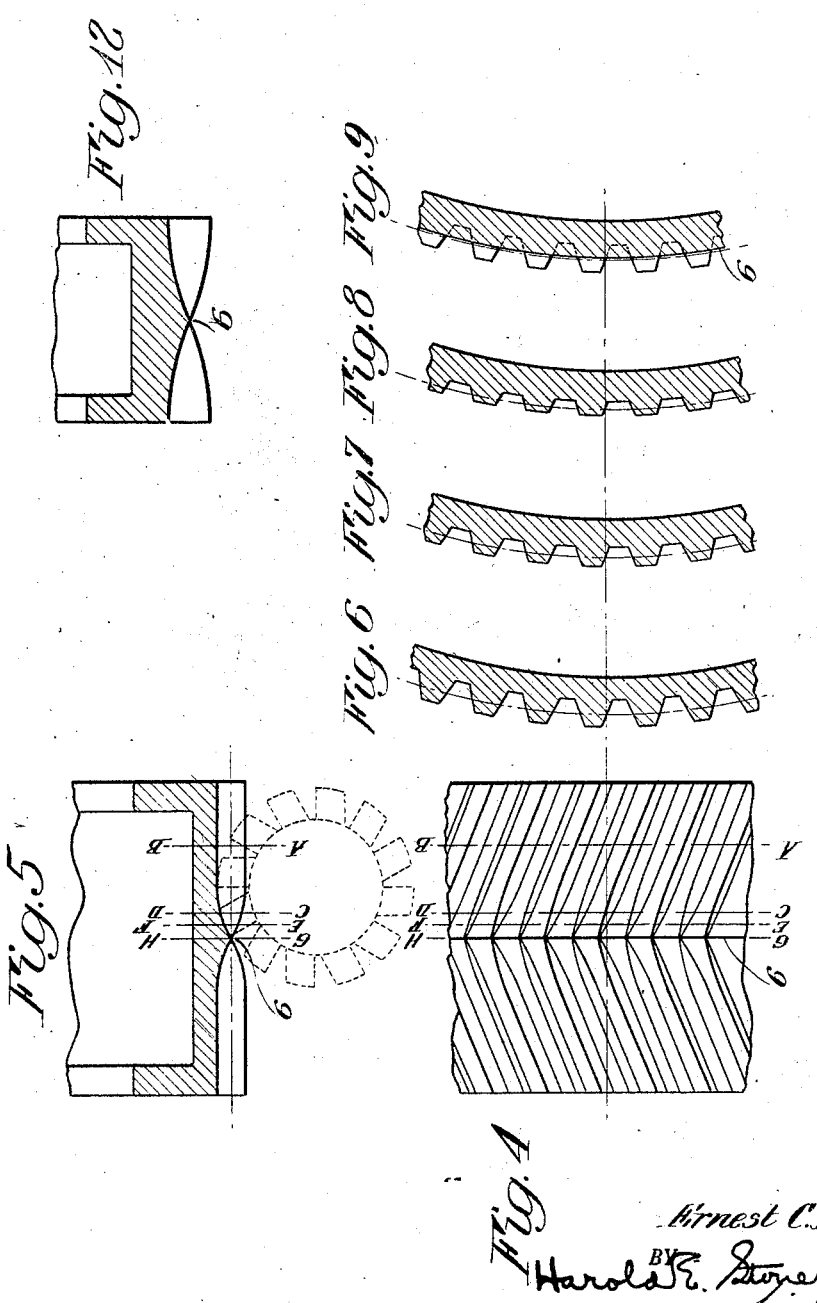

Patented Apr. 20, 1926.

1,581,737

UNITED STATES PATENT OFFICE.

ERNEST C. HEAD, OF ROCHESTER, NEW YORK, ASSIGNOR TO GLEASON WORKS, OF ROCHESTER, NEW YORK, A CORPORATION OF NEW YORK.

HERRINGBONE GEAR.

Application filed January 23, 1922. Serial No. 531,105.

*To all whom it may concern:*

Be it known that I, ERNEST C. HEAD, a citizen of the United States of America, residing at Rochester, in the county of Monroe and State of New York, have invented certain new and useful Improvements in Herringbone Gears, of which the following is a specification.

The invention relates to herringbone gears, or gears having teeth extending from the center of a gear face in opposite directions to the sides thereof, the teeth on one side of the gear face forming angles with the teeth on the other side of the gear face, and the principal object of the invention is to afford a gear of this nature which can be produced quickly and economically.

A further object of the invention is to provide a gear that can be manufactured on a practical and commercial basis, and which will be characterized by accurate, smooth and uniformly cut teeth, such that contact can be had between the teeth of a pair of intermeshing gears entirely across the gear face, with no gap or broken area at the center of the gear face.

An additional purpose is to afford a gear in which the teeth are reduced in depth at the center of the gear face, while still maintaining uniform curvature of profile and uniform thickness of tooth throughout its length, thus insuring proper contact between the reduced portions of the teeth of intermeshing gears.

Another object of the invention is to construct a gear with a tooth of such form as to lend itself readily and successfully to the manufacture of both large and small gears, either of spur or bevel type.

With these and other ends in view, the invention embraces the structure that will appear fully from the following description, in conjunction with the accompanying drawings, the novel features being pointed out in the claims following the description.

In the drawings:

Figure 1 is a plan view of a portion of the face of a gear embodying the invention, as constructed on a planing machine;

Figure 2 is a sectional view of the same;

Figure 3 is a side elevation, partially broken away;

Figure 4 is a plan view of a portion of a gear face, constructed on a hobbing machine;

Figure 5 is a sectional view through Figure 4, and indicating, in dotted lines, the final cutting positions of the hob when traversing the gear face to form the teeth;

Figures 6, 7, 8 and 9 are sectional views taken respectively on the lines A—B, C—D, E—F and G—H of Figures 4 and 5;

Figure 10 is a plan view of a portion of the face of a bevel gear made in accordance with the invention;

Figure 11 is a sectional view of the gear illustrated in Figure 10, and

Figure 12 is a sectional view of a modified from of gear embodying the invention.

The gear forming the subject matter of the invention may be constructed in a variety of ways, as for instance, on different types of planing machines, as set forth in co-pending application, Serial No. 531,107, filed January 23, 1922, or on a hobbing machine, as set forth in co-pending application, Serial No. 531,106, filed Jan. 23, 1922, or other types of metal working machinery, and it is the purpose of this application to protect the product, irrespective of the method or machine by which it is made.

In Figures 1 to 3 is illustrated in general the type of gear that is cut on a gear planing machine, as also in Figures 10 and 11, while Figures 4 and 5 illustrate the gear resulting from a hobbing machine operation, and Figures 6 to 9 inclusive disclose characteristics of gears made by any of the machines or methods referred to herein.

Referring to Figures 1 to 3, the gear includes teeth formed on opposite sides of the gear face and extending from opposite edges to the center of the gear face, designated at 1. Each tooth comprises a body portion 2, preferably of uniform depth throughout, with the top and bottom parallel, and an end portion 3 which is of gradually reduced depth and located adjacent to the center 1 of the gear face. Preferably, the reduced end portion 3 terminates at the center 1, and merges into the end portion of the corresponding tooth on the opposite side of the gear face, said reduced end portion being preferably formed by forming the top and bottom of each tooth in converging relationship.

This may be accomplished by moving a planing tool parallel to the face of the gear to form the body portion 2, and swinging the tool outwardly toward the gear face to form the reduced end portion, as fully set forth in one of the aforesaid pending applications. The tops of the teeth, or the gear face, is cut away at 4, in any convenient manner, affording the necessary complementary portion to the central enlargement 5 on the other member of a pair of intermeshing gears.

A gear cut according to the system just described can also be generated in any suitable way, according to the well known principles of gear generation, by effecting a relative rolling motion between the gear blank and tool. While Figures 1 to 3 disclose a spur gear, the same principles can be applied to the manufacture of a bevel gear, as illustrated in Figures 10 and 11, and for the purpose of this application, it is unnecessary to make further reference to this particular phase of the invention, since the system can be adapted to a bevel gear generator, and a bevel gear thereby produced.

Figures 4 and 5 illustrate the invention as formed on a hobbing machine, as fully set forth in one of the aforesaid pending applications. To construct the gear in this manner, the hob or hobs are caused to traverse the gear face from the outer edge thereof toward the center until the final cut of the hob is at the center of the gear face, as illustrated in Figure 5. Thus, the circular form of the hob produces a tooth of decreasing depth at the center, the bottom of the tooth curving outwardly on the arc formed by the hob, and the face of the gear or the tops of the teeth are cut away at 6 to correspond to the outwardly curving bottoms of the teeth.

Where a hob is employed, it cuts only on one side of a tooth at a time, and the cutting edges of the hob are arranged perpendicularly to its rotary axis, as fully set forth in said pending application, and likewise where the gear is made by a planing operation, the cutting edge of the tool is arranged perpendicularly to the axis about which the tool swings during its outward travel to form the reduced portion of the tooth at the center of the gear face. The result of this is to retain a uniform curvature in the profile of the tooth throughout its length, as illustrated in Figures 6 to 9, where sections of the teeth are shown at different points of the body and reduced end portions.

The thickness of the tooth remains uniform throughout its length, that is to say, the thickness, measured at any point on the pitch line or any lines parallel thereto, will be the same at any part of the body portion or reduced end portion of the tooth, since the outward swinging movement of the tool, in the case of the planing operation, and the cutting action of the tools moving away from the bottom in the case of the hob, in no way affects or modifies the profile of the tooth, as established throughout the body portion. Thus it is possible to obtain proper contact between the teeth of an intermeshing pair entirely across the face of the gear, with effective engagement between the cooperating reduced end portions of engaging teeth. A gear such as described possesses all the known advantages of a herringbone gear, while at the same time securing maximum contact between the teeth across the gear face, and correspondingly increased efficiency.

In Figure 12 is illustrated a modified form of the invention, in which the tooth varies in depth throughout its length. In this form, there is no body portion of uniform depth, but the tooth is formed entirely by an outwardly swinging or rotating motion of the tool from the deepest portion of the tooth outwardly toward the gear face. Such a gear is advantageous where a very long tooth is not required, and is within the province of the invention, since it involves a tooth decreasing in depth toward the center of the gear face, and of uniform curvature and thickness throughout its length.

The invention is not limited to the precise embodiments herein disclosed, but comprehends any modifications or other adaptations coming within the fundamental principles of the improvement, or the scope of the following claims.

I claim:

1. A herringbone gear, each tooth of which includes a body portion of uniform depth and an effective end portion of reduced depth located adjacent to the center of the gear face.

2. A herringbone gear, each tooth of which includes a body portion of uniform depth and an end portion of reduced depth terminating at the center of the gear face.

3. A herringbone gear, each tooth of which includes a body portion of uniform depth and an end portion of reduced depth terminating at the center of the gear face, the profile of the tooth having the same curvature throughout both the body portion and the reduced end portion.

4. A herringbone gear, each tooth of which includes a body portion of uniform depth and an end portion of reduced depth terminating at the center of the gear face, the thickness of the tooth at any points on the pitch line or any line parallel thereto being the same throughout both the body portion and reduced end portion.

5. A herringbone gear, each tooth of which includes a body portion having a top and bottom arranged parallel and an end portion adjacent to the center of the gear face having a top and bottom in converging relationship.

6. A herringbone gear, each tooth of which includes a body portion having a top and bottom arranged parallel and an end portion terminating at the center of the gear face and having a top and bottom in converging relationship.

7. A herringbone gear, each tooth of which includes a body portion having a top and bottom arranged parallel and an end portion terminating at the center of the gear face and having a top and bottom in converging relationship, the profile of the tooth having the same curvature throughout both the body portion and end portion.

8. A herringbone gear, each tooth of which includes a body portion having a top and bottom arranged parallel and an end portion terminating at the center of the gear face and having a top and bottom in converging relationship, the thickness of the tooth at any points on the pitch line or any line parallel thereto being the same throughout both the body portion and end portion.

9. A herringbone gear consisting of pairs of teeth correspondingly located on opposite sides of the center of the gear face, each pair of teeth including body portions, and end portions that are of reduced depth entirely across the teeth and meet at the center of the gear face.

10. A herringbone gear consisting of pairs of teeth correspondingly located on opposite sides of the center of the gear face, each pair of teeth including body portions, and end portions that are of reduced depth and meet at the center of the gear face, the profile of each tooth having the same curvature throughout both the body portion and end portion.

11. A herringbone gear consisting of pairs of teeth correspondingly located on opposite sides of the center of the gear face, each pair of teeth including body portions, and end portions that are of reduced depth and meet at the center of the gear face, the thickness of each tooth at any points on the pitch line or any line parallel thereto being the same throughout both the body portion and end portion.

12. A herringbone gear consisting of pairs of teeth correspondingly located on opposite sides of the center of the gear face, each pair of teeth including body portions, and end portions each of which has a top and bottom converging, the end portion of the tooth on one side of the gear face converging into the corresponding tooth on the opposite side of the gear face.

13. A herringbone gear consisting of pairs of teeth correspondingly located on opposite sides of the center of the gear face, each pair of teeth including body portions, and end portions each of which has a top and bottom converging, the end portion of the tooth on one side of the gear face converging into the corresponding tooth on the opposite side of the gear face, the profile of each tooth having the same curvature throughout both the body portion and end portion.

14. A herringbone gear consisting of pairs of teeth correspondingly located on opposite sides of the center of the gear face, each pair of teeth including body portions, and end portions each of which has a top and bottom converging, the end portion of the tooth on one side of the gear face converging into the corresponding tooth on the opposite side of the gear face, the thickness of each tooth at any points on the pitch line or any line parallel thereto being the same throughout both the body portion and end portion.

15. A herringbone gear with teeth decreasing in depth toward the center of the gear face and effective throughout their entire lengths.

16. A herringbone gear with teeth decreasing in depth toward the center of the gear face, each tooth having uniform curvature throughout its length.

17. A herringbone gear with teeth decreasing in depth toward the center of the gear face, the thickness of each tooth at any points on the pitch line or any line parallel thereto being the same throughout its length.

18. A gear provided with helically arranged teeth having body portions of uniform depth and end portions of reduced depth, and with helically arranged grooves intermediate the teeth the bottoms of which are concave adjacent the reduced end portions of the teeth.

19. A gear having helical teeth, each of which has a curved profile and is of varying depth from end to end and of uniform thickness throughout its length, measured on the pitch line or any line parallel thereto, and having helical grooves intermediate the teeth, each of which has a bottom portion which is concave.

In witness whereof, I have hereunto signed my name.

ERNEST C. HEAD.